United States Patent
Wu

(10) Patent No.: US 8,842,373 B2
(45) Date of Patent: Sep. 23, 2014

(54) IMAGE CATCHING LENS AND ELECTRONIC DEVICE USING THE SAME

(71) Applicant: Ability Enterprise Co., Ltd., Taipei (TW)

(72) Inventor: Mu-Yuan Wu, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 54 days.

(21) Appl. No.: 13/760,502

(22) Filed: Feb. 6, 2013

(65) Prior Publication Data

US 2013/0201566 A1    Aug. 8, 2013

(30) Foreign Application Priority Data

Feb. 7, 2012  (TW) .............................. 101103961 A

(51) Int. Cl.
*G02B 15/14*  (2006.01)
*G02B 7/10*  (2006.01)
*G02B 7/04*  (2006.01)

(52) U.S. Cl.
CPC ... *G02B 7/04* (2013.01); *G02B 7/10* (2013.01)
USPC ......................................................... 359/704

(58) Field of Classification Search
USPC .................................. 359/704, 703, 694, 676
See application file for complete search history.

(56) References Cited

U.S. PATENT DOCUMENTS 6,987,930 B2    1/2006  Nomura
7,952,814 B2 *  5/2011  Koyama et al. ............... 359/699

* cited by examiner

*Primary Examiner* — Tuyen Tra
(74) *Attorney, Agent, or Firm* — Rabin & Berdo, P.C.

(57) ABSTRACT

The image catching lens comprises a forwarding barrel and a guider. The forwarding barrel has an outer surface and an inner surface, and comprises a forwarding groove group, wherein the forwarding groove group comprises a first forwarding groove formed on the outer surface of the forwarding barrel and a second forwarding groove formed along the first forwarding groove and toward the inner surface. The guider comprises a guiding group, wherein the guiding group comprises a protrusion disposed corresponding to the second forwarding groove.

20 Claims, 5 Drawing Sheets

IMAGE CATCHING LENS AND ELECTRONIC DEVICE USING THE SAME

This application claims the benefit of Taiwan application Serial No. 101103961, filed Feb. 7, 2012, the subject matter of which is incorporated herein by reference.

BACKGROUND OF THE INVENTION

1. Field of the Invention

The invention relates in general to an image catching lens and an electronic device using the same, and more particularly to an image catching lens with a prolonged optical zooming path and an electronic device using the same.

2. Description of the Related Art

Along with the advance in technology, digital camera mechanism has been widely used in various digital products such as digital camera, digital video recorder, mobile phone, personal digital assistant (PDA). The digital camera mechanism comprises an image catching lens and an image sensor. The image catching lens focuses an image on the image sensor, and then the image sensor converts an optical image signal into an electrical signal.

Conventional image catching lens comprises a number of barrels which move relatively to each other. A forwarding barrel of the barrels has a groove, which defines an optical zooming path. Through the groove, the forwarding barrel may move in a straight line to change the focus.

However, For the thickness of the image catching lens is reduced, the length of the forwarding path of the forwarding barrel is restricted to the thickness of the barrel connected thereto, such that the length of the optical zooming is restricted indirectly.

SUMMARY OF THE INVENTION

The invention is directed to an image catching lens with a lengthened optical zooming path and an electronic device using the same.

According to an embodiment of the present invention, an image catching lens is provided. The image catching lens comprises a forwarding barrel and a guider. The forwarding barrel has an outer surface and an inner surface, and comprises a forwarding groove group, wherein the forwarding groove group comprises a first forwarding groove formed on the outer surface of the forwarding barrel and a second forwarding groove formed along the first forwarding groove and toward the inner surface. The guider comprises a guiding group, wherein the guiding group comprises a protrusion disposed opposite to the second forwarding groove.

According to another embodiment of the present invention, an electronic device is provided. The electronic device comprises an image catching lens. The image catching lens comprises a forwarding barrel and a guider. The forwarding barrel has an outer surface and an inner surface, and comprises a forwarding groove group, wherein the forwarding groove group comprises a first forwarding groove formed on the outer surface of the forwarding barrel and a second forwarding groove formed along the first forwarding groove and toward the inner surface. The guider comprises a guiding group, wherein the guiding group comprises a protrusion disposed corresponding to the second forwarding groove.

According to another embodiment of the present invention, an image catching lens is provided. The image catching lens comprises a forwarding barrel and a guider. The forwarding barrel has a first surface and a second surface, and comprises a first forwarding groove, a second forwarding groove and a stop portion, wherein two opening of the first forwarding groove are exposed from the first surface and the second surface respectively, and the second forwarding groove is extended to the stop portion from the second surface toward the first surface. The guider comprises a guiding group, wherein the guiding group comprises a protrusion corresponding to the second forwarding groove.

According to another embodiment of the present invention, an image catching lens is provided. The image catching lens comprises a forwarding barrel and a guider. The forwarding barrel has a first surface and a second surface opposite to the first surface, and comprises at least a forwarding groove group, wherein the forwarding groove group comprises a first forwarding groove, a second forwarding groove and a first stop, two opening of the first forwarding groove are exposed from the first surface and the second surface respectively, the second forwarding groove is extended by a first distance from the second surface toward the first surface, and the first stop is disposed within the opening of the second surface. The guider comprises a guiding group disposed corresponding to the forwarding groove group, wherein the forwarding groove group comprises a first flange and a protrusion. Wherein the first flange slides in accordance with the first forwarding groove, and the protrusion slides in accordance with the second forwarding groove.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
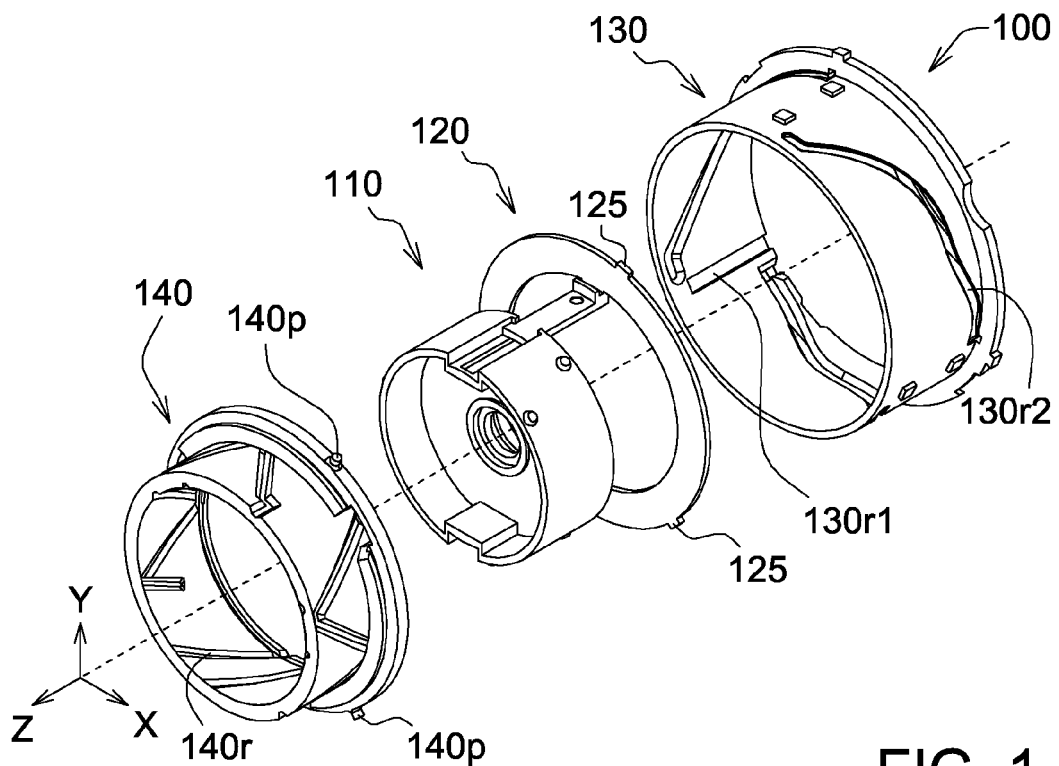
FIG. 1 shows a decomposition diagram of a image catching lens according to an embodiment of the invention.

Referring to FIG. 1, a decomposition diagram of an image catching lens according to an embodiment of the invention is shown. The image catching lens 100 may be widely used in various electronic devices with image capturing function, and may be realized by such as digital camera, digital video recorder, mobile phone or personal digital assistant (PDA).

The image catching lens 100 comprises a forwarding barrel 110, a guider 120, a first barrel 130 and a second barrel 140.

The first barrel 130 comprises at least one forwarding groove 130r1 and at least one groove 130r2. In the present embodiment, the groove 130r2 is rotation groove. To elaborate the present embodiment in greater details, "rotation groove" denotes the groove structure can make the barrel rotate. For example, the groove 130r2 extends along and around the Z-axis and is thus able to guide the barrel connected thereto to rotate and move in a straight line. "Forwarding groove" denotes the groove structure can make the barrel move in a straight line. For example, the forwarding groove 130r1 of the first barrel 130 only extends along the Z-axis, such that the guider 120 straightly moves with respect to the first barrel 130.

The first barrel 130 can be driven by a driving barrel (not illustrated) to move with respect to the driving barrel. For example, the first barrel 130 is driven to move straightly and/or rotate. In present embodiment, the first barrel 130 is driven to move straightly, for example.

The second barrel 140 comprises at least one groove 140r and at least one pin 140p. The pin 140p of the second barrel 140 slides in accordance with the groove 130r2 of the first barrel 130, such that when the first barrel 130 straightly moves along Z-axis, the second barrel 140 can rotate and straightly move. The Z-axis is such as the direction of the center axis of the barrel or the optical axis of the image catching lens 100.

Although it is not illustrated in the diagram, the image catching lens 100 may comprise a lens group disposed inside the forwarding barrel 110. The lens group can comprise such as at least one concave lens and/or at least one convex lens. By the first barrel 110 straightly moving, the position of the lens group may thus be changed, and accordingly a position of a focal point can be changed.

Figure 2A:
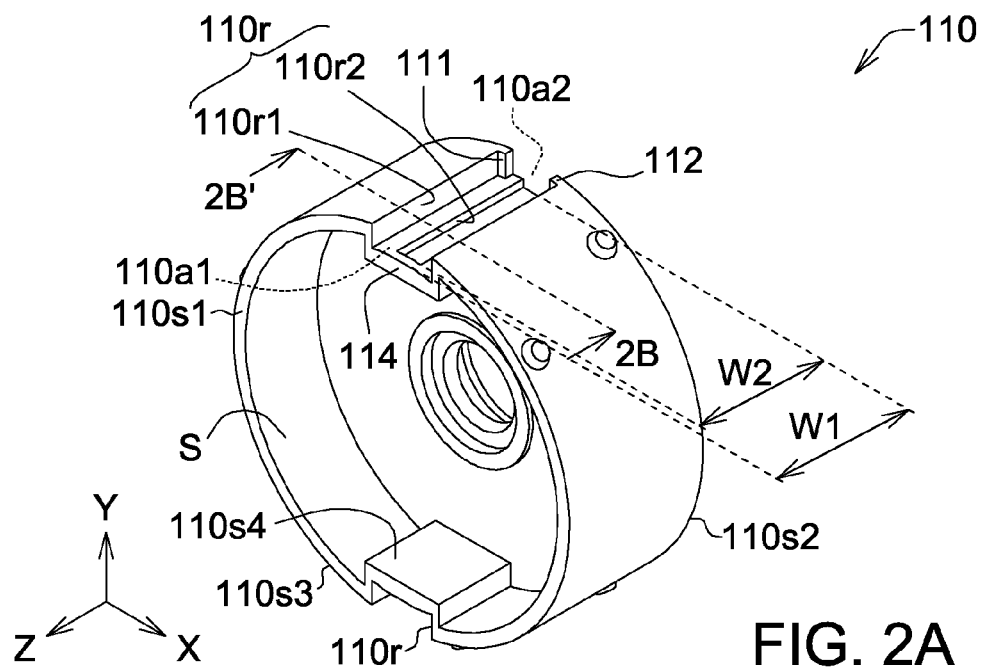
FIG. 2A shows an appearance of the forwarding barrel of FIG. 1.

Referring to FIG. 2A, an appearance of the forwarding barrel of FIG. 1 is shown. The forwarding barrel 110 has two forwarding groove groups 110r, a first surface 110s1 and a second surface 110s2 opposite to the first surface 110s1 and comprises a first stop 111 and a second stop 112, wherein the first stop 111 and the second stop 112 are disposed within the first forwarding groove 110r1 and adjacent to the second surface 110s2. For example, the first stop 111 and the second stop 112 can connect the second surface 110s2 (a lateral surface of the first stop 111 and that of the second stop 112 are aligned with the second surface 110s2, such as coplanar), be adjacent to but not connect the second surface 110s2, or be protruded from the second surface 110s2. By the design for the position of the first stop 111 and the second stop 112, a corresponding optical path length can be obtained. For example, the closer a distance from the second surface 110s2 to the first stop 111 and the second stop 112 is, the longer a moving path of the guider 120 moving with respect to the forwarding barrel 110, and accordingly a longer optical path length is obtained.

In present embodiment, the first stop 111 is disposed opposite to the second stop 112. In another embodiment, the second stop 112 of the forwarding barrel 110 can be omitted.

In FIG. 2A, in present embodiment, one forwarding groove group 110r is disposed opposite to another forwarding groove group 110r. For example, the circular angle between the two forwarding barrel 110 is 180 degrees. In another embodiment, the circular angle between the two forwarding barrel 110 is not 180 degrees. In present embodiment, the number of the forwarding barrels 110 is two; in another embodiment, the number of the forwarding barrels 110 is single or more than two.

In FIG. 2A, each forwarding groove group 110r comprises a first forwarding groove 110r1 and a second forwarding groove 110r2 interconnected with the first second forwarding groove 110r. The first forwarding groove 110r is formed on an outer surface 110s3 of the forwarding barrel 110, and second forwarding groove 110r2 is formed along the first forwarding groove 110r1 and toward an inner surface 110s4 of the forwarding barrel 110. In addition, the first forwarding groove 110r1 exposes a first opening 110a1 from the first surface 110s1, and exposes a second opening 110a2 from the second surface 110s2. Furthermore, the first forwarding groove 110r1 perforates the forwarding barrel 110 along a width direction of the forwarding barrel 110 (for example, the width direction is from the first surface 110s1 to the second surface 110s2). The above first stop 111 and the second stop 112 are disposed within the second opening 110a2.

In FIG. 2A, the second forwarding barrel 110r2 is extended by a first distance W1 from the second surface 110s2 toward the first surface 110s1, wherein the first distance W1 is less than a width W2 between the first surface 110s1 and the second surface 110s2 to form a stop portion 114. That is, the second forwarding groove 110r2 is extended to the stop portion 114 from the second surface 110s2 toward the first surface 110s1. The stop portion 114 can block a protrusion 123 of the guider 120 (described below) to avoid the guider 120 is separated from the forwarding barrel 110.

Figure 2B:
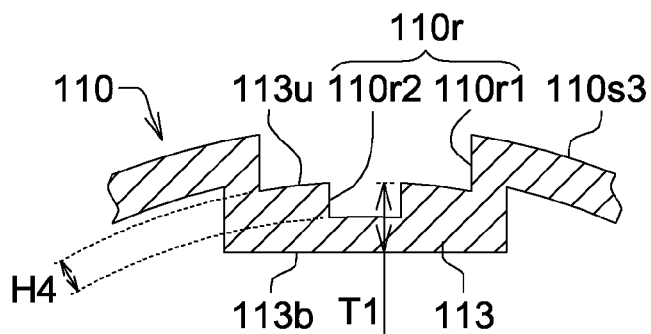
FIG. 2B shows a cross-sectional view along a direction 2B-2B' of the FIG. 2A.

Referring to FIG. 2B, a cross-sectional view along a direction 2B-2B' of the FIG. 2A is shown. In present embodiment, the forwarding barrel 110 comprises a bottom portion 113, and the first forwarding groove 110r1 is extended to the bottom portion 113 from the outer surface 110s3 of the forwarding barrel 110. The second forwarding groove 110r2 is extended by a second distance H4 from an upper surface 113u of the bottom portion 113 toward an inner surface 113b of the bottom portion 113, wherein the second distance H4 is less than a thickness T1 of the bottom portion 113. That is, the second forwarding groove 110r2 does not perforate the forwarding barrel 110, such that the strength of the forwarding barrel 110 is not excessively reduced by the second forwarding groove 110r2.

In another embodiment, although it is not illustrated in the diagram, the second forwarding groove 110r2 perforates the forwarding barrel 110 along the thickness direction of the forwarding barrel 110. For example, the second forwarding groove 110r2 can perforate the bottom portion 113 of FIG. 2B. For example, a lower thickness portion of the bottom portion 113 of FIG. 2B can be omitted to expose the second forwarding groove 110r2. Under the circumstances, an inner space S (illustrated in FIG. 2A) in the forwarding barrel 110 can be enlarged to promote a spatial match for an element (such as an optical element).

Figure 3A:
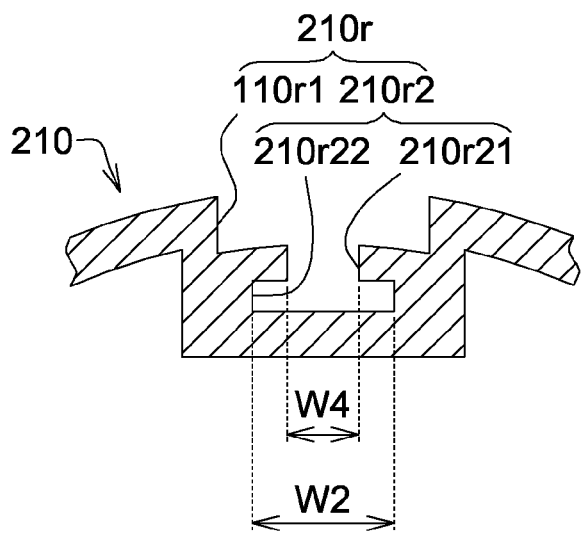
FIG. 3A shows a cross-sectional view of a part of a forwarding barrel in another embodiment.
Figure 3B:
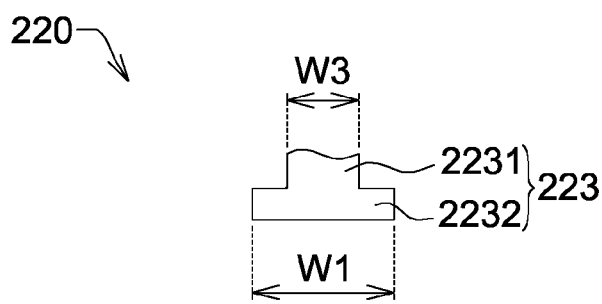
FIG. 3B shows a cross-sectional view of a part of a protrusion of a guider in another embodiment.

Referring to FIGS. 3A and 3B, FIG. 3A shows a cross-sectional view of a part of a forwarding barrel in another embodiment, and FIG. 3B shows a cross-sectional view of a part of a protrusion of a guider in another embodiment. The image catching lens of the present embodiment comprises a forwarding barrel 210 (illustrated in FIG. 3A), a guider 220 (illustrated in FIG. 3B), a first barrel 130 (not illustrated) and a second barrel 140 (not illustrated).

In FIG. 3A, the forwarding barrel 210 comprises a forwarding groove group 210r comprising a first forwarding groove 110r1 and a second forwarding groove 210r2, wherein the second forwarding groove 210r2 comprises a first sub-forwarding groove 210r21 and a second sub-forwarding groove 210r22 interconnected with the first sub-forwarding groove 210r21. A width of the first sub-forwarding groove 210r21 is different from that of the second sub-forwarding groove 210r22, such that the second forwarding groove 210r2 forms a T-shaped groove. In addition, the other structures of the forwarding barrel 210 may be similar to that of the forwarding barrel 110.

In FIG. 3B, the guide 220 comprises a protrusion 223 comprising a first sub-protrusion 2231 and a second sub-protrusion 2232. When the forwarding barrel 210 is set to the guider 220, the first sub-protrusion 2231 of the guider 220 is set to the first sub-forwarding groove 210r21 of the forwarding barrel 210 and the second sub-protrusion 2232 of the guider 220 is set to the second sub-forwarding groove 210r22 of the forwarding barrel 210, such that the protrusion 223 steadily slides in the forwarding groove group 210r and prevents the forwarding barrel 210 is separated from the guider 220. In addition, the other structures of the guide 220 may be similar to that of the guider 120.

In FIG. 3B, the second sub-protrusion 2232 has a first width W1 which is substantially same as or less than a width W2 (illustrated in FIG. 3A) of the second sub-forwarding groove 210r22. The first sub-protrusion 2231 has a width W3 which is substantially same as or less than a width W4 (illustrated in FIG. 3A) of the first sub-forwarding groove 210r21. In an embodiment, the first width W1 of the second sub-protrusion 2232 is substantially same as or slightly less than the width W2 of the second sub-forwarding groove 210r22. Under the circumstances, the width W3 of the first sub-protrusion 2231 can be less than the width W4 of the first sub-forwarding groove 210r21, such that an over-restriction of the width W4 can be avoided. In another embodiment, the width W3 of the first sub-protrusion 2231 is substantially same as or slightly less than the width W4 of the first sub-forwarding groove 210r21. Under the circumstances, the width W1 of the second sub-protrusion 2232 can be less than the width W2 of the second sub-forwarding groove 210r22, such that an over-restriction of the width W2 can be avoided.

Figure 4:
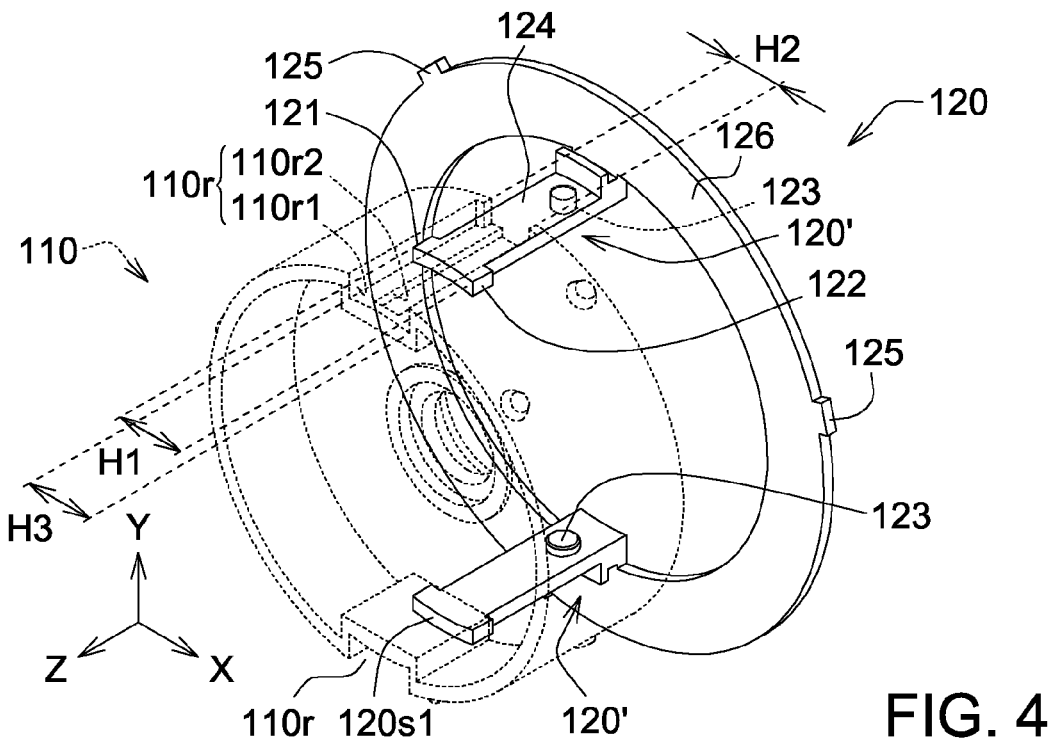
FIG. 4 shows an appearance of the guider of FIG. 1.

Referring to FIG. 4, an appearance of the guider of FIG. 1 is shown. The guider 120 comprises two guiding groups 120' respectively connected to the two forwarding groove groups 110r. In present embodiment, one guiding group 120' is disposed opposite to another guiding group 120'. For example, the circular angle between the two guiding groups 120' is 180 degrees. In another embodiment, the circular angle between the two guiding groups 120' is not 180 degrees. In present embodiment, the number of the guiding groups 120' is two. in another embodiment, the number of the guiding groups 120' is one or more than two.

Each guiding groups 120' comprises a first flange 121, a second flange 122 and a protrusion 123, wherein the protrusion 123 is disposed corresponding to the second forwarding groove 110r2, and the first flange 121 is disposed corresponding to the first forwarding groove 110r1. The first flange 121 is set to an end of the guiding groups 120' and slides in accordance with the forwarding groove group 110r.

In FIG. 4, a first distance H1 between the first flange 121 and the second flange 122 is larger than a second distance H2 between the first stop 111 and the second stop 112. When the guider 120 slides with respect to the forwarding barrel 110, the first flange 121 slides in accordance with the first forwarding groove 110r1, and the first flange 121 and the first stop 111 stop from each other to avoid the guider 120 separated from the forwarding barrel 110.

In FIG. 4, a first distance H1 between the first flange 121 and the second flange 122 is slightly less or substantially same as a width H3 of the first forwarding groove 110r1, such that the first flange 121 and the second flange 122 can easily slide in accordance with the first forwarding groove 110r1.

The protrusion 123 can be set to the second forwarding groove 110r2. When the guider 120 slides with respect to the forwarding barrel 110, the protrusion 123 slides in accordance with the second forwarding groove 110r2, and the protrusion 123 can be stopped by the stop portion 114 of the forwarding barrel 110 to avoid the guider 120 being separated from the forwarding barrel 110. In another embodiment, the second flange 122 of the guider 120 can be omitted.

In FIG. 4, the guider 120 further comprises at least one pin 125 connected to the forwarding groove 130r1 (illustrated in FIG. 1) of the first barrel 130. Through the forwarding groove 130r1, the guider 120 can straightly slide with respect to the first barrel 130.

In FIG. 4, each guiding groups 120' further comprises an extension portion 124, the first flange 121 and the second flange 122 are adjacently disposed to one end of the extension portion 124. The protrusion 123 is adjacently disposed to another end of the extension portion 124. In addition, the guider 120 further comprises a ring-shaped element 126 connected to the two guiding groups 120'.

As mentioned above, through the first flange 121 and the second flange 122 sliding in accordance with the first forwarding groove 110r1, and the protrusion 123 of the guider 120 sliding in accordance with the second forwarding groove 110r2, the guider 120 straightly slides with respect to the forwarding barrel 110 to protrude from the first surface 110s1 of the forwarding barrel 110 and from the second surface 110s2 of the forwarding barrel 110 to prolong the length of the optical zooming path.

Figure 5A:
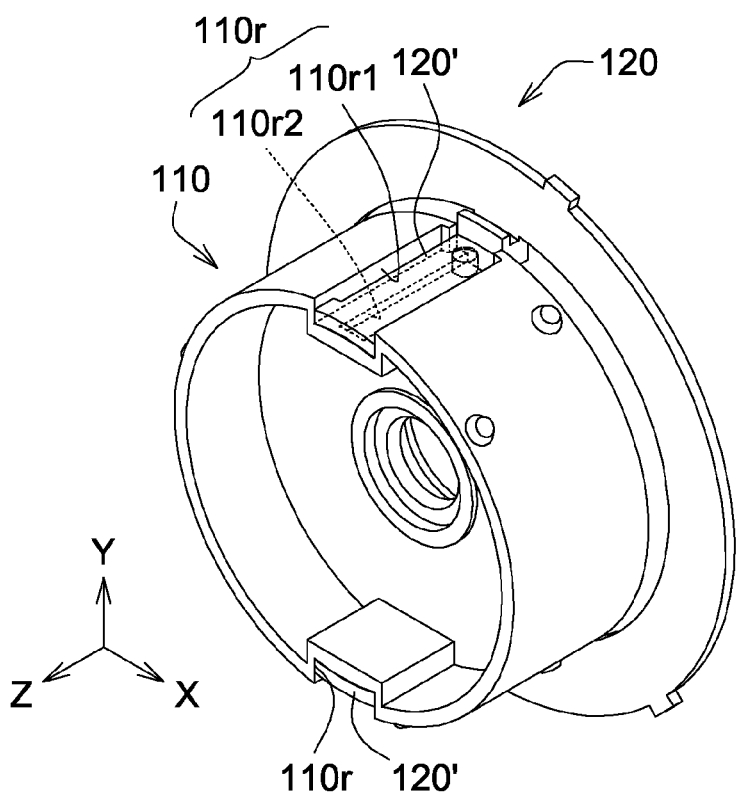
FIG. 5A shows an appearance of the image catching lens of FIG. 1 being at a close end.

Referring to FIG. 5A, an appearance of the image catching lens of FIG. 1 being at a close end is shown. The guiding groups 120' is connected to the forwarding groove group 110r, such that forwarding barrel 110 slides with respect to the guide 120.

Figure 5B:
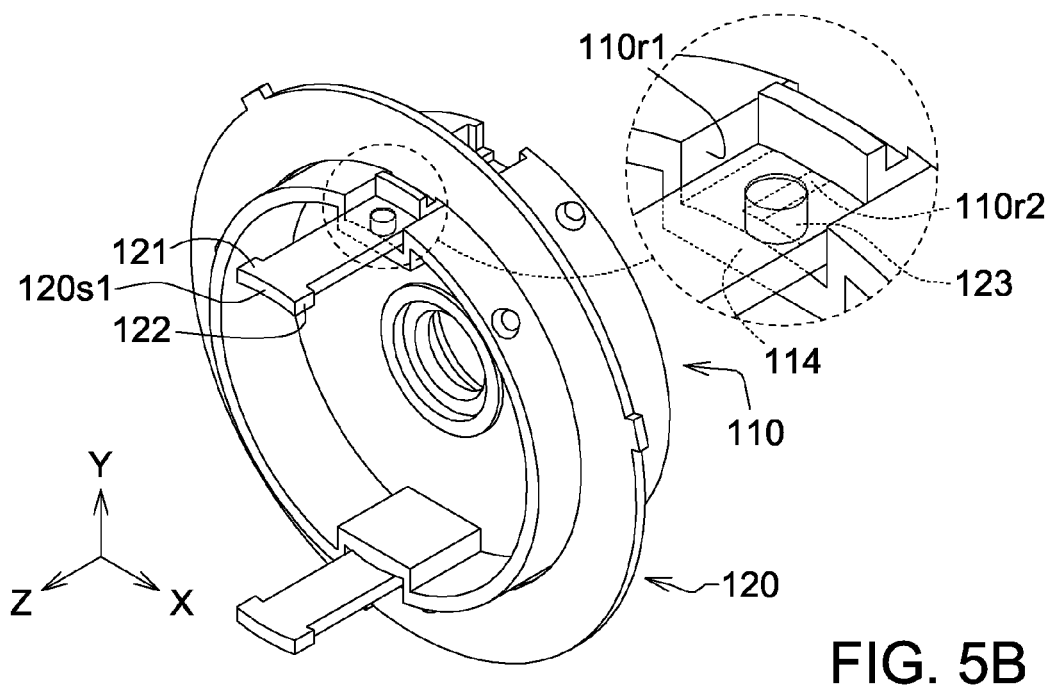
FIG. 5B shows an appearance of the forwarding barrel and the guider of FIG. 5A being at a wide-angle end.

Referring to FIG. 5B, an appearance of the forwarding barrel and the guider of FIG. 5A being at a wide-angle end is shown. During the second barrel 140 (illustrated in FIG. 1) rotating around the +Z-axis and straightly moving along the +Z-axis, the forwarding barrel 110 of FIG. 5A straightly moves with respect to the guider 120 along the −Z-axis, such that the guider 120 and the forwarding barrel 110 can lie in the wide-angle end of FIG. 5B.

In FIG. 5B, during the forwarding barrel 110 straightly moves with respect to the guider 120, since the protrusion 123 of the guider 120 is stopped by the stop portion 114 of the forwarding barrel 110, such that the forwarding barrel 110 is not separated from the guider 120.

In FIG. 5B, during the forwarding barrel 110 and the guider 120 are transformed to the wide-angle end (illustrated in FIG. 5B) from the close end (illustrated in FIG. 5A), though the first flange 121 and the second flange 122 of the guider 120 are separated from the first forwarding groove 110r1, the forwarding barrel 110 can straightly move with respect to the guider 120 along −Z-axis due to the protrusion 123 of the guide 120 still slides in accordance with the second forwarding groove 110r2, such that the guider 120 protrudes from the first surface 110s1 of the forwarding barrel 110 and accordingly the length of the optical zooming path is prolonged.

Figure 5C:
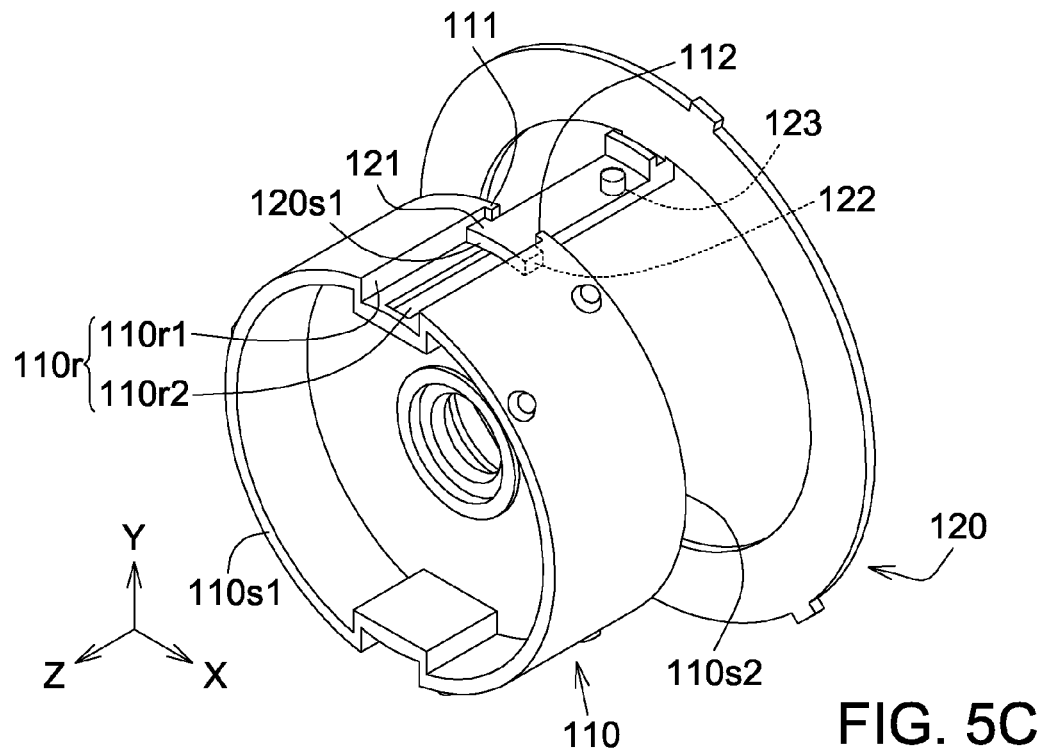
FIG. 5C shows an appearance of the forwarding barrel and the guider of FIG. 5B being at a telephoto end.

Referring to FIG. 5C, an appearance of the forwarding barrel and the guider of FIG. 5B being at a telephoto end is shown. During the second barrel 140 (illustrated in FIG. 1) rotating around the +Z-axis and straightly moving along the +Z-axis, the forwarding barrel 110 of FIG. 5B straightly moves with respect to the guider 120 along the +Z-axis, such that the guider 120 and the forwarding barrel 110 can lie in the telephoto end of FIG. 5C.

In FIG. 5C, during the forwarding barrel 110 and the guider 120 are transformed to the telephoto end (illustrated in FIG. 5C) from the wide-angle end (illustrated in FIG. 5B), though the protrusion 123 of the guider 120 is separated from the second forwarding groove 110r2 of the forwarding barrel 110, the forwarding barrel 110 can straightly move with respect to the guider 120 along +Z-axis to protrude from the end 120s1 of the guider 120 (or the guider 120 protrudes from the second surface 110s2 of the forwarding barrel 110) due to the first flange 121 and the second flange 122 still slide in accordance with the first forwarding groove 110r1, and accordingly the length of the optical zooming path is prolonged.

In addition, since the circular angle between the two guiding groups 120' is 180 degree, the two guiding groups 120' clamp the forwarding barrel 110 like clamper to avoid the forwarding barrel 110 separating from the guider 120; however, such exemplification not meant to be limiting, an embodiment is described below in FIG. 6.

Figure 6:
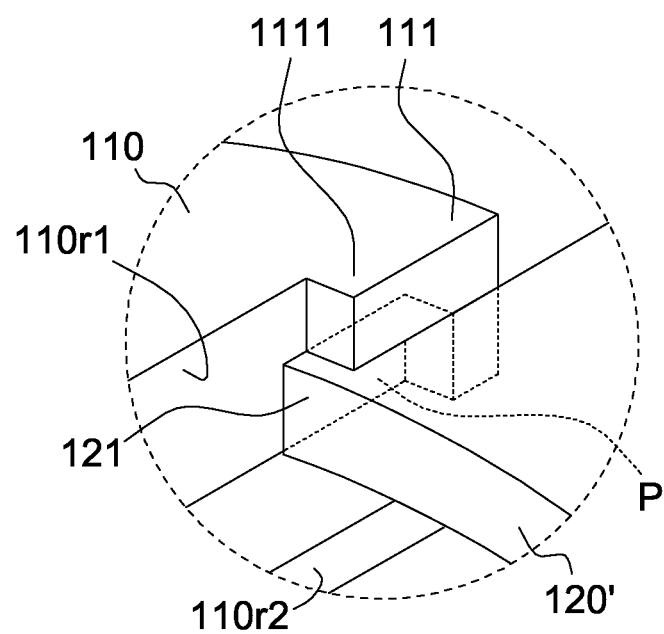
FIG. 6 shows an appearance of a stop portion of a forwarding barrel according to another embodiment of the invention.

Referring to FIG. 6, an appearance of a stop portion of a forwarding barrel according to another embodiment of the invention is shown. In the present embodiment, the forwarding barrel 110 further comprises an engaging portion 1111 connected to the first stop 111 to define an accommodation space P. When the forwarding barrel 110 and the first stop 111 lie in the telephoto end (illustrated in FIG. 5C), at least one portion of the first flange 121 can be accommodated in the accommodation space P to be engaged or be stopped by the engaging portion 1111. To avoid the guiding groups 120' which is separated from the forwarding barrel 110 along a radial direction (such as Y-axis).

The length of the engaging portion 1111 can be designed as longer or shorter one. In one embodiment, the length of the engaging portion 1111 can be lengthened toward the first surface 110s1 (illustrated in FIG. 5C) to broaden the accommodation space P. Accordingly, before the protrusion 123 is separated from the second forwarding groove 110r2, the first flange 121 can be held in the accommodation space P to avoid the guiding groups 120' which is separated from the forwarding barrel 110 along the radial direction of the forwarding barrel 110.

In addition, in FIG. 6, the number of the guiding groups 120' can be one or more than one.

According to the image catching lens disclosed in the above embodiments of the invention, through the first flange and second flange sliding in accordance with the first forwarding groove, and the protrusion of the guider sliding in accordance with the second forwarding groove, such that the guider straightly moves with respect to the forwarding barrel to protrude from the first surface of the forwarding barrel or from the second surface of the forwarding barrel, and accordingly the length of the optical zooming path is prolonged.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image catching lens, comprising:
a forwarding barrel having an outer surface and an inner surface, and comprising a forwarding groove group, wherein the forwarding groove group comprises a first forwarding groove formed on the outer surface of the forwarding barrel and a second forwarding groove formed along the first forwarding groove and toward the inner surface; and
a guider comprising a guiding group, wherein the guiding group comprises a protrusion disposed corresponding to the second forwarding groove.

2. The image catching lens according to claim 1, wherein the forwarding groove group further comprises a first stop disposed within the first forwarding groove.

3. The image catching lens according to claim 2, wherein the forwarding barrel has a first surface and a second surface opposite to the first surface, an opening of the first forwarding groove is exposed from the second surface, and the first stop is disposed within the opening.

4. The image catching lens according to claim 1, wherein the forwarding barrel further comprises a first surface, a second surface and a stop portion, and the second forwarding groove is extend to the stop portion along a direction from the second surface to the first surface.

5. The image catching lens according to claim 1, the guiding group further comprises a first flange disposed corresponding to the first forwarding groove.

6. The image catching lens according to claim 5, wherein when the forwarding barrel moves with respect to the guider, the first flange slides in accordance with the first forwarding groove, and the protrusion slides in accordance with the second forwarding groove.

7. An electronic device comprises the image catching lens claimed in claim 1.

8. An image catching lens, comprising:
a forwarding barrel having a first surface and a second surface, and comprising a first forwarding groove, a second forwarding groove and a stop portion, wherein two openings of the first forwarding groove are exposed from the first surface and the second surface respectively, and the second forwarding groove is extended to the stop portion from the second surface toward the first surface; and
a guider comprising a guiding group, wherein the guiding group comprises a protrusion disposed corresponding to the second forwarding groove.

9. The image catching lens according to claim 8, wherein the second forwarding groove is formed along the first forwarding groove, wherein the first forwarding groove is interconnected with the second forwarding groove.

10. The image catching lens according to claim 8, wherein the second forwarding groove perforates the forwarding barrel.

11. The image catching lens according to claim 8, wherein the second forwarding groove is a T-shaped groove.

12. The image catching lens according to claim 8, wherein the forwarding barrel comprises a bottom portion, the first forwarding groove is extended to the bottom portion, and the second forwarding groove is extended by a distance from an upper surface of the bottom portion toward an inner surface of the bottom portion.

13. The image catching lens according to claim 12, wherein the distance is less than a thickness of the bottom portion.

14. The image catching lens according to claim 8, wherein the guiding group further comprises a first flange disposed corresponding to the first forwarding groove.

15. The image catching lens according to claim 14, wherein the forwarding barrel further comprises:
a first stop disposed within the first forwarding groove; and
an engaging portion connecting the first stop, the engaging portion and the first stop defined an accommodation space, and when the first flange is accommodated in the accommodation space, the first flange is limited by the engaging portion.

16. The image catching lens according to claim 14, wherein the forwarding barrel further comprises a first stop disposed corresponding to the first flange.

17. The image catching lens according to claim 16, wherein the first stop is disposed within the first forwarding groove.

18. The image catching lens according to claim 17, wherein the first flange slides in accordance with the first forwarding groove, and the protrusion slides in accordance with the second forwarding groove.

19. An image catching lens, comprising:
- a forwarding barrel having a first surface and a second surface opposite to the first surface, wherein the forwarding barrel comprises at least a forwarding groove group comprising a first forwarding groove, a second forwarding groove and a first stop, two opening of the first forwarding groove are exposed from the first surface and the second surface respectively, the second forwarding groove is extended by a first distance from the second surface toward the first surface, and the first stop is disposed within the opening of the second surface; and
- a guider comprising a guiding group disposed corresponding to the forwarding groove group, wherein the guider comprises a first flange and a protrusion;
- wherein the first flange slides in accordance with the first forwarding groove, and the protrusion slides in accordance with the second forwarding groove.

20. The image catching lens according to claim 19, wherein the first distance is less than a distance between the first surface and the second surface.

\* \* \* \* \*